UNITED STATES PATENT OFFICE.

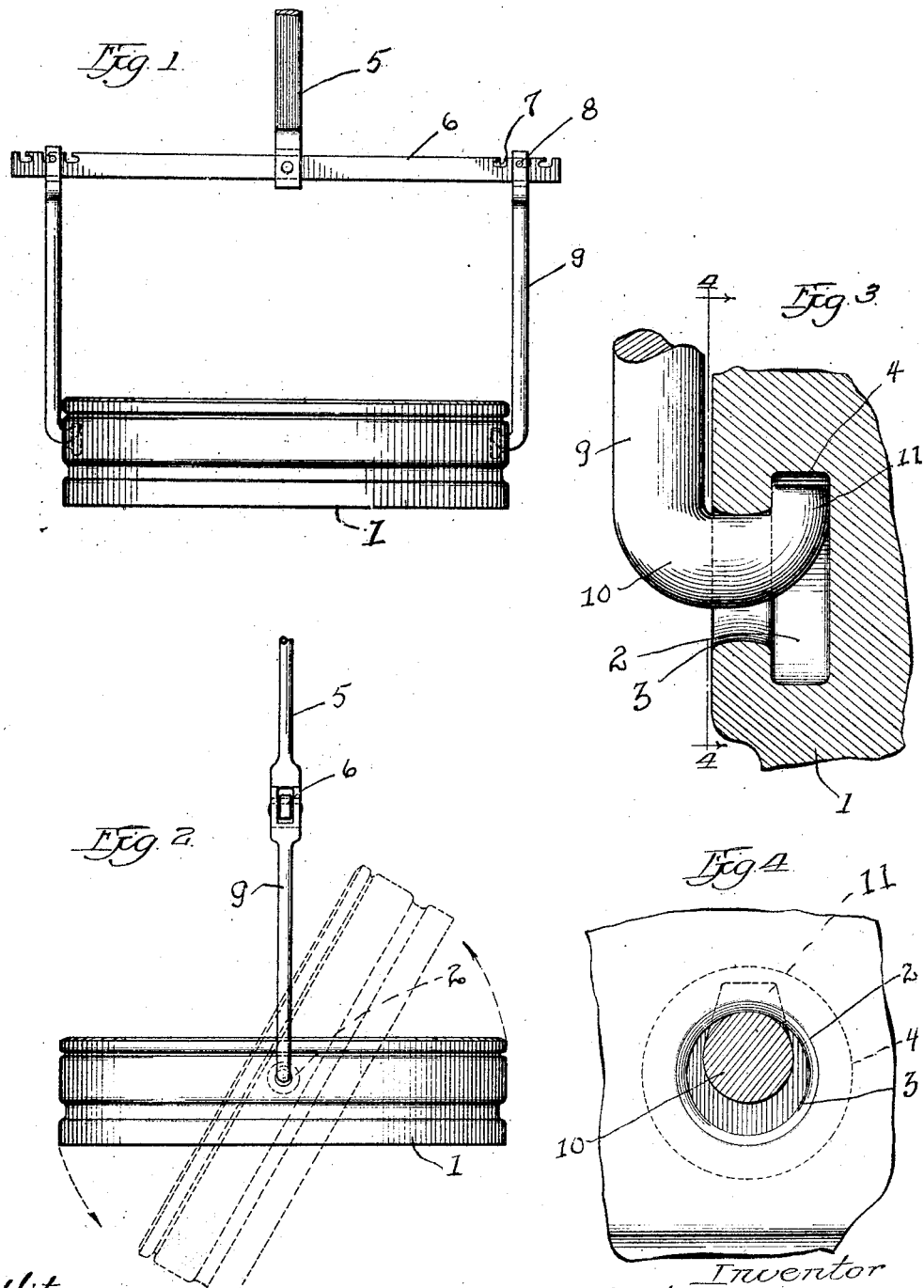

JOEL A. WILDROUDT, OF AKRON, OHIO.

MOLD CONSTRUCTION.

1,382,398.   Specification of Letters Patent.   Patented June 21, 1921.

Application filed January 10, 1921. Serial No. 436,061.

*To all whom it may concern:*

Be it known that I, JOEL A. WILDROUDT, a citizen of the United States, residing at Akron, in the county of Summit and State of Ohio, have invented certain new and useful Improvements in Mold Construction, of which the following is a specification.

This invention relates to certain improvements in the construction of molds for use in vulcanizing tires or other articles of rubber and is designed to improve upon the constructions now in general use, in order that the heavy mold parts may be handled more easily and quickly and without danger to the operator.

In the present mold construction used in the vulcanization of rubber tires the annular mold top or cover is provided with a number of projecting lugs around which are passed chains, which are connected to a block and tackle or other lifting medium. By means of the chain the mold lid or top is lifted to remove a cured tire and to insert a green or uncured tire in its place. While the mold lid or top is lifted, the lower half of the mold may be cleaned and the upper half is tilted so that it may be cleaned or scrubbed also. As the chains intersect the circumference of the mold, it is impossible to turn the mold lid but a little way so that the cleaning of the inside surface is awkward and is apt to be slighted, as a section is out of sight. The lugs of the outer surface of the mold interfere with the handling of the mold and they prevent rolling of the top. As the molds are very heavy it is a great advantage to be able to move them about by rolling.

The chains looped around the lugs of the mold top offer an insecure means of supporting the heavy lid and often they have slipped over the lugs and serious injury has resulted.

By my invention the inconvenient and dangerous projecting lugs are eliminated and a safe and practicable means for supporting the mold section is provided, for the invention may be applied to the lower half of the mold as well as the upper half, although it is particularly described for the upper half.

It is obvious that the method of attaching and supporting the mold lid is not necessarily limited to that shown in the drawings, but may be varied or modified as will be readily understood, retaining the principles of the invention.

In the drawings:

Figure 1 is a side elevation of a mold section and the supporting means therefor.

Fig. 2 is a view at right angles to Fig. 1 showing the mold in tilted position in dotted lines.

Fig. 3 is an enlarged view of the connection between the lifting means and the mold section.

Fig. 4 is a sectional view in the line 4—4 of Fig. 3.

The mold section is designated by the numeral 1, and while the invention is of greater advantage when applied to the top half of the mold, it may be used with the lower half as well. At diametrically opposite points in the circumference of the mold and at about or a little above the center of gravity of the mold lid, are located two depressions or recesses —2—. While these recesses are shown at only two points they may be arranged at as many points as desirable about the mold. These recesses have small or restricted circular openings or entrances —3— which communicate with larger spaces —4— within the mold wall.

The means for supporting the mold section comprises any sort of arm or hanger —5— and to which is connected a cross arm —6—, the parts being elevated by any desirable lifting means. At the ends of the cross arms are formed a plurality of notches or recesses —7— here shown as L shaped, although this shape is not essential, in which are received the cross pins —8— which in turn support a plurality of hangers —9—.

Each of the hangers —9— is formed with a hook shaped lower end —10— which is adapted to enter the opening —3—, the upturned end —11— being received within the larger portion of the recess, as shown in Fig. 3. The wall of the opening —3— is preferably rounded as shown in Fig. 3 to afford a small bearing surface, so that rotation of the mold is obtained without a great amount of friction.

The arrangement of the rigid arms permits the complete rotation of the mold so that it may be easily cleaned in a vertical or horizontal position, an operation which was impossible under the old arrangement, as the chains interfere with the turning over of the mold section.

Having the recesses provided in the mold circumference presents a smooth, unbroken surface on the periphery so that when the mold is lowered on the floor it may be rolled wherever desired.

It will be noticed that a plurality of notches —7— are provided in the cross bar —6— so that the arm —9— can be adjusted to accommodate different size molds. The rigid arms are not essential it being possible to use chains and provide a spreader to remove them from the path of the mold as it turns.

The inturned hooked ends of the hangers —9— securely hold the mold sections and there is no danger of the arms spreading to drop the part being elevated, thus making an entirely satisfactory means of supporting the mold sections from the safety standpoint, and forming what might be termed an interlocking engagement between the mold section and the lifting device.

It is apparent that variations and modifications may be made in details, or proportions, or arrangement of the parts without departing from the invention or sacrificing any of its benefits. Such changes as fall within the scope of the claims appended hereto are intended to be covered herein and are a part of this invention.

Claims:

1. A vulcanizing mold having an undercut recess in its outer periphery, adapted to have an interlocking rotary engagement with a lifting device.

2. A tire mold having a smooth circular outer periphery and oppositely arranged undercut recesses, adapted to have an interlocking engagement with a lifting device.

3. A circular tire curing mold, having a smooth outer periphery, whereby it may be rolled on its side, and oppositely arranged undercut recesses having restricted circular openings, whereby the mold may have an interlocking rotary engagement with a lifting device.

4. A circular tire vulcanizing mold having a smooth outer periphery whereby it may be rolled on its side, and recesses formed in its sides for engagement with lifting devices, said recess being circular in form and undercut so as to be restricted at their mouths whereby an interlocking rotary engagement with the lifting devices may be obtained.

5. In a mold construction, a mold section, and hangers, the hangers being so constructed and arranged as not to interfere with rotation of the mold section while supported thereon, the mold section and the ends of the hangers having an interlocking engagement whereby spreading of the lifting devices is prevented.

6. In a mold construction, a mold section, and a lifting device, the said lifting device being so constructed and arranged as to be removed from the path of the mold section in rotation on the lifting device, hook shaped extremities in said lifting devices the side of the mold section being arranged with recesses having restricted openings so that the spreading of the lifting device is prevented.

7. In a mold construction, a mold section and lifting devices, the extremities of each lifting device being in the form of a hook with a return portion so as to provide a supporting surface lower than the end of the hook, and said mold being provided with a recess having a restricted opening, the end of the hook being received in the recess and the wall about said opening resting on the supporting surface when the lifting device is supporting the mold section.

JOEL A. WILDROUDT.